(12) United States Patent
Graziani et al.

(10) Patent No.: US 9,015,961 B2
(45) Date of Patent: Apr. 28, 2015

(54) SHOE WITH VENTILATION SYSTEM OBTAINED BY DIRECT INJECTION METHOD ON UPPER AND MOULD THEREFOR

(75) Inventors: Giordano Graziani, Corridonia (IT); Augusto Pagliari, Corridonia (IT)

(73) Assignee: Gruppo Meccaniche Luciani S.R.L., Corridonia (IT)

( * ) Notice: Subject to any disclaimer, the term of this patent is extended or adjusted under 35 U.S.C. 154(b) by 622 days.

(21) Appl. No.: 12/998,136

(22) PCT Filed: Mar. 26, 2010

(86) PCT No.: PCT/EP2010/054040
§ 371 (c)(1),
(2), (4) Date: Mar. 18, 2011

(87) PCT Pub. No.: WO2010/115737
PCT Pub. Date: Oct. 14, 2010

(65) Prior Publication Data
US 2011/0167679 A1    Jul. 14, 2011

(30) Foreign Application Priority Data
Apr. 8, 2009 (IT) .............................. MC2009A0077

(51) Int. Cl.
| | |
|---|---|
| *A43B 7/08* | (2006.01) |
| *A43B 13/20* | (2006.01) |
| *A43B 21/06* | (2006.01) |
| *A43B 7/12* | (2006.01) |
| *B29C 44/12* | (2006.01) |
| *B29D 35/00* | (2010.01) |
| *B29D 35/06* | (2010.01) |

(52) U.S. Cl.
CPC ................. *A43B 7/081* (2013.01); *A43B 7/125* (2013.01); *B29C 44/1271* (2013.01); *B29D 35/0036* (2013.01); *B29D 35/061* (2013.01)

(58) Field of Classification Search
CPC ............. A43B 7/08; A43B 7/18; A43B 17/08
USPC .................. 36/3 R, 70 A, 75 R, 152, 167, 177
See application file for complete search history.

(56) References Cited

U.S. PATENT DOCUMENTS

| | | | | |
|---|---|---|---|---|
| 5,044,096 | A * | 9/1991 | Polegato | 36/3 R |
| 5,400,526 | A * | 3/1995 | Sessa | 36/3 B |
| 5,655,314 | A * | 8/1997 | Petracci | 36/3 B |
| 5,826,349 | A * | 10/1998 | Goss | 36/3 R |
| 6,085,444 | A * | 7/2000 | Cho | 36/3 B |
| 6,670,029 | B2 * | 12/2003 | Norton et al. | 428/308.4 |

(Continued)

*Primary Examiner* — Khoa Huynh
*Assistant Examiner* — Timothy K Trieu
(74) *Attorney, Agent, or Firm* — Lowe Hauptman & Ham, LLP

(57) ABSTRACT

A shoe (1) is disclosed comprising: an insole (1) fixed to the upper (T) and comprising a slot (10) in the heel area and a plurality of holes (11) in the plantar surface area. A ventilation system (2) comprises: a pump (4) disposed in the slot (10) of the insole, a membrane (3) fixed in the lower surface of the insole (1) under the holes (11), a connection pipe (20) connecting the chamber (40) of the pump with the spaces (32) of the membrane and an outlet conduit (21) connecting the chamber of the pump (40) with the outside to exhaust air. An outsole (9) obtained by directly injecting expandable material in a mold covers the ventilation system, insole and lower part of the upper (T). A mold (S) for performing said direct injection is also disclosed.

14 Claims, 14 Drawing Sheets

(56) References Cited

U.S. PATENT DOCUMENTS

| | | | |
|---|---|---|---|
| 7,028,418 B1* | 4/2006 | Huang | 36/12 |
| 7,930,839 B2* | 4/2011 | Litchfield et al. | 36/29 |
| 8,037,623 B2* | 10/2011 | Passke et al. | 36/29 |
| 2007/0000151 A1* | 1/2007 | Su | 36/14 |
| 2009/0019727 A1* | 1/2009 | Fenzi | 36/44 |

* cited by examiner

FIG. 1
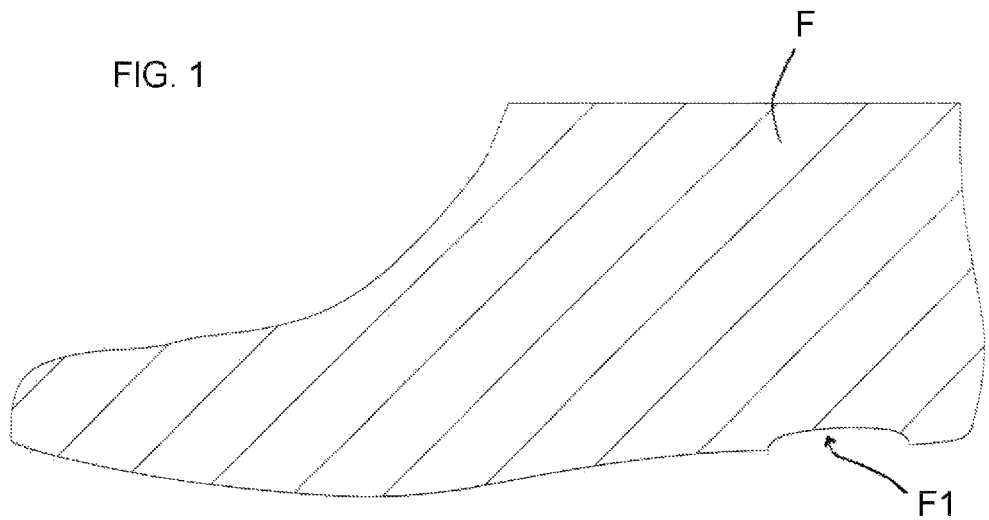
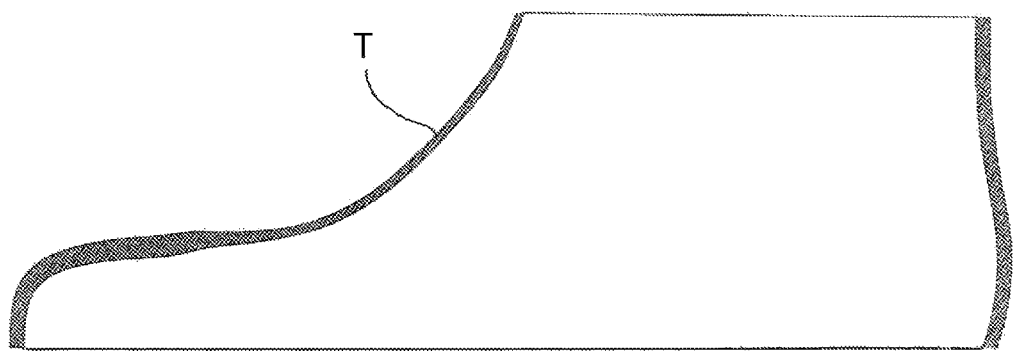
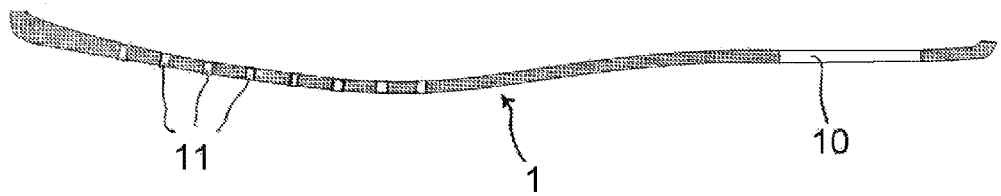

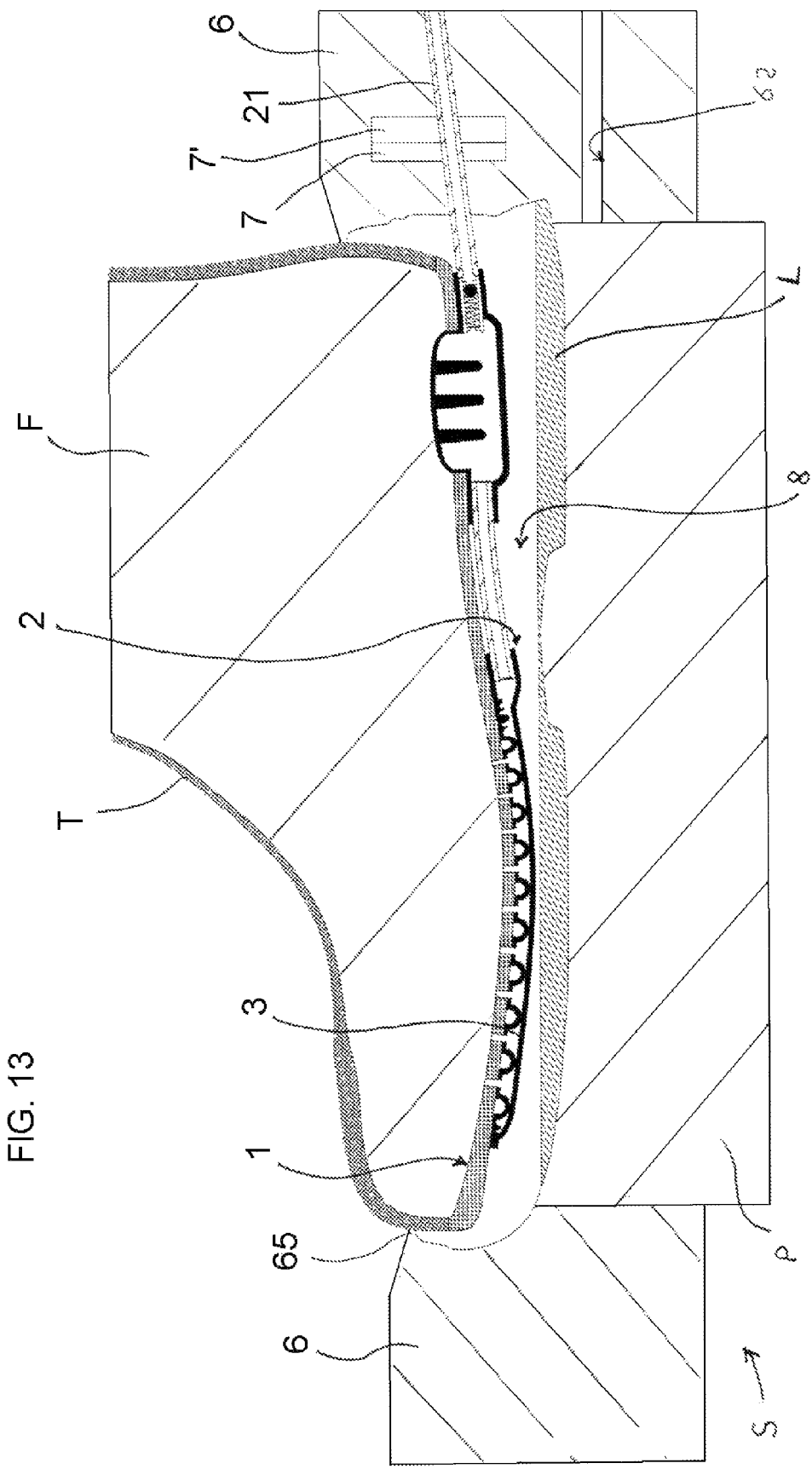

SHOE WITH VENTILATION SYSTEM OBTAINED BY DIRECT INJECTION METHOD ON UPPER AND MOULD THEREFOR

The present application for industrial invention relates to a shoe with ventilation or transpiration system obtained with direct injection process on upper.

As it is known, a shoe is mainly made of an upper around the foot and an outsole glued to the upper that acts as tread. In traditional shoes the two parts are manufactured separately and then glued. Before gluing the outsole on the upper, various mechanisms can be inserted in the outsole to obtain a transpiration system. Transpiration systems applied to this type of shoe are available on the market.

In the direct injection process on upper, instead, the outsole is molded inside a mould and directly injected on the upper, filling all empty spaces between upper and outsole, without the possibility of leaving any space to insert the various mechanisms of the ventilation system.

GB 2 317 089 discloses a ventilated shoe, an injection mould and a method to obtain a ventilated shoe.

WO99/2650 discloses a method to obtain a ventilated shoe by means of injection molding.

The purpose of the present invention is to eliminate the drawbacks of the known art by devising a shoe with ventilation or transpiration system obtained with direction injection process on upper.

This purpose has been achieved according to embodiment(s) of the present invention.

Advantageous embodiments are disclosed in the dependent claims.

The shoe of the invention comprises:
upper,
insole fixed to upper,
ventilation system disposed under insole, and
outsole obtained by directly injecting expandable material in a mould, in such a way to cover ventilation system, insole and lower part of the upper.

Advantageously, the insole comprises a slot or projection in the heel area and a plurality of holes in the plantar surface area.

The ventilation system comprises:
a pump disposed in said slot or projection of the insole to form an air chamber,
a membrane fixed in the lower surface of the insole under said holes, in such a way to generate at least one space in communication with said holes,
a connection pipe that connects the chamber of the pump to the spaces of the membrane, and
an inlet or outlet conduit that connects the chamber of the pump with the outside to extract or exhaust air.

The advantages of the shoe of the invention are clear, since it allows for foot ventilation and has been studied in such a way that the outsole is obtained by molding expandable material directly on the upper of the shoe.

Additional characteristics of the invention will appear evident from the detailed description below, which refers to merely illustrative, not limiting embodiments, illustrated in the enclosed drawings, wherein:

FIG. 1 is a diagrammatic exploded axial sectional view of last, upper and insole;

FIG. 13 is the same view as FIG. 9, with expandable liquid material injected in the mould;

Referring to FIG. 1, the following parts are shown in the exploded view: last (F), upper (T) and insole (1).

The last (F), of known type, reproduces the shoe to be made. Although the last (F) is diagrammatically shown as one piece, it can be made of multiple articulated pieces in order to simplify the insertion and removal of the shoe. In particular, the last (F) is provided with recessed seat (F1) in the lower part of the heel.

The upper (T) is of known type and can be made of fabric, imitation leather, leather, and similar materials.

Also the insole (T) is of known type and can be made of fabric, imitation leather, leather, and similar materials. Preferably, the insole (1) is made of perspiring fabric, such as Kevlar.

Figure 2:
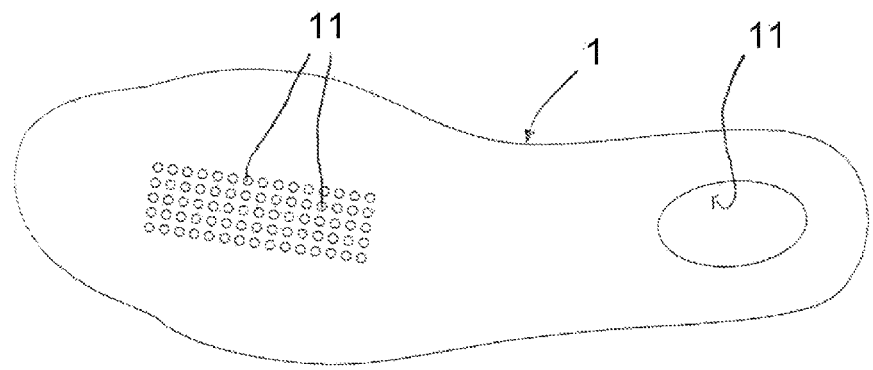
FIG. 2 is a top view of the insole of FIG. 1.

As shown in FIG. 2, the insole (1) is provided with an elliptical slot (10) in the heel area and a plurality of small holes (11) in the plantar surface area. The slot (10) is in register with the recessed seat (F1) of the shape.

Figure 3:
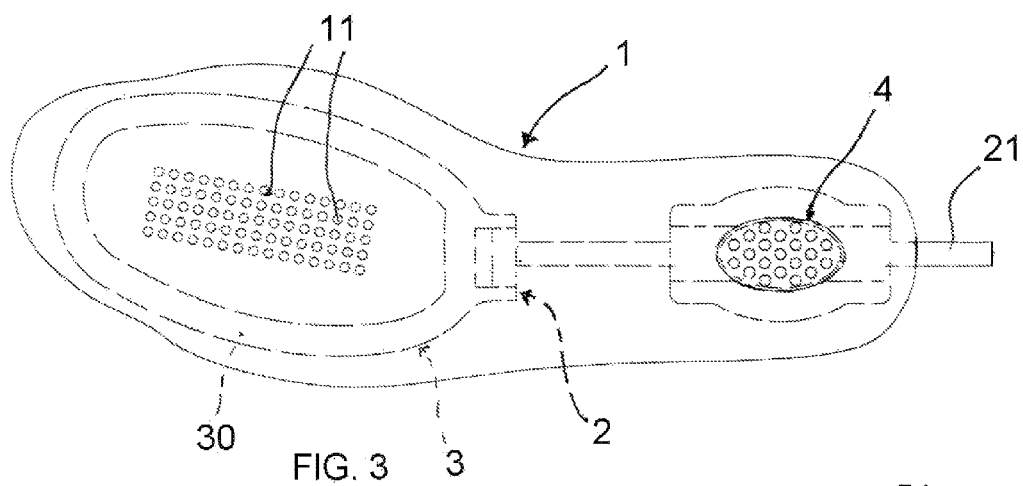
FIG. 3 is a top view of the insole of FIG. 2 with ventilation system.
Figure 4:
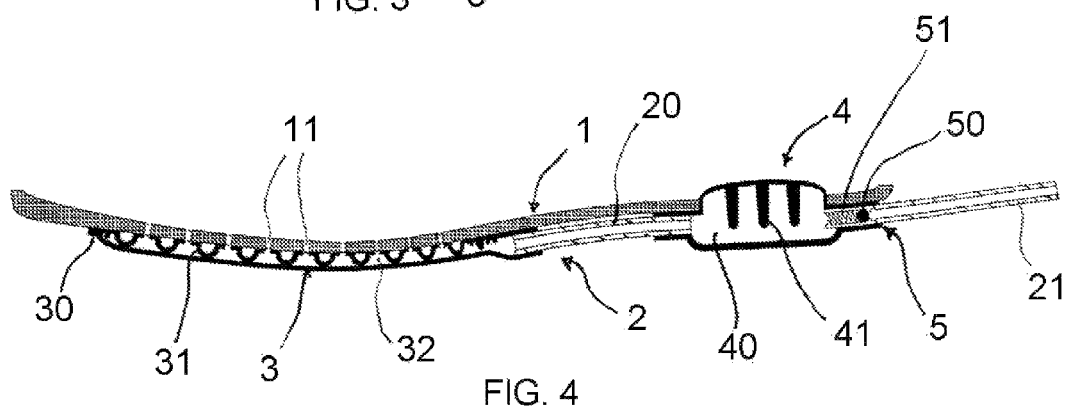
FIG. 4 is an axial sectional view of the insole and ventilation system assembly of FIG. 3.

Referring to FIGS. 3 and 4, a ventilation system (2) is fixed by means of sewing and/or gluing on the lower surface of the insole (1).

The ventilation system (2) comprises a membrane (3) disposed under the surface of the insole (1), under the holes (11), and a pump (4) that is disposed in the slot (10) of the heel of the insole.

The membrane (3) is provided with a peripheral frame (30) that is fixed to the insole. Deformable spacers (31) are situated between the membrane (3) and the insole. The spacers (31) are shaped as internally empty spherical segments, facing the membrane (3). Between the spacers (31) a plurality of spaces (32) is generated in mutual communication and in communication with the holes (11) provided in the insole (1).

The pump (4) forms a pumping chamber (40) that communicates with the spaces (32) of the membrane (3) by means of a connection pipe (20). The upper wall of the pump (4) is provided with deformable spacers (41) shaped as pins that extend in the chamber (40) of the pump.

The chamber (40) of the pump communicates with an inlet pipe (21) that extends behind the insole (1). Between the inlet pipe (21) and the chamber of the pump (4) a non-return (monodirectional) valve (5) is disposed, allowing for air flow from the inlet pipe (21) to the chamber (40) of the pump and not vice versa.

For illustrative purposes, the non-return valve (5) comprises a spherical shutter (50) stressed by a spring (51) to maintain the valve normally closed.

Figure 5:
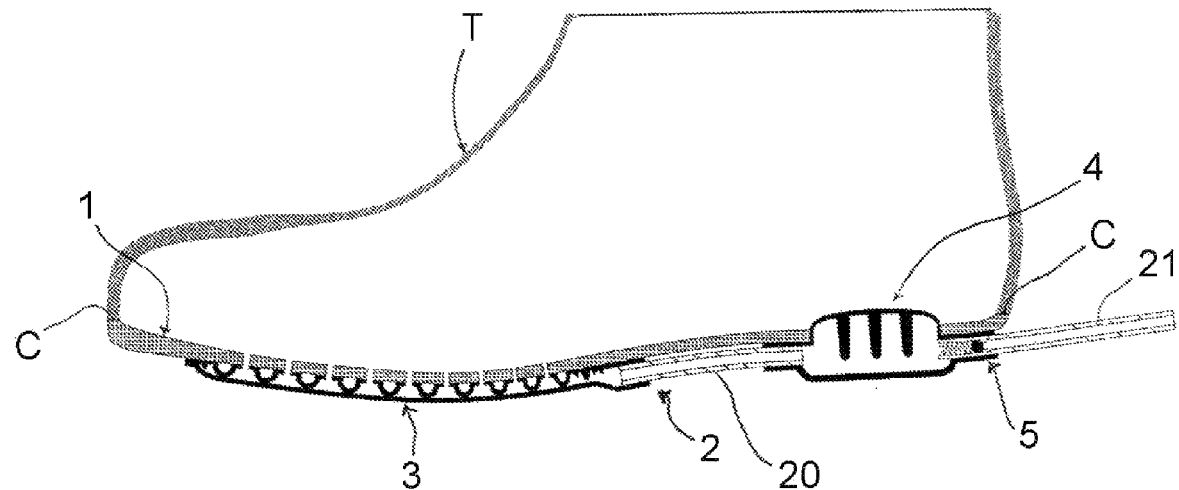
FIG. 5 shows the insole and ventilation system assembly of FIG. 4 applied to the upper of FIG. 1.

As shown in FIG. 5, once the ventilation system (2) has been mounted under the insole (1), the insole (1) is sewn to the upper with a seam (C). It must be noted that the inlet pipe (21) protrudes on the back from the ventilation system (2), being basically parallel to the insole (1).

Figure 6:
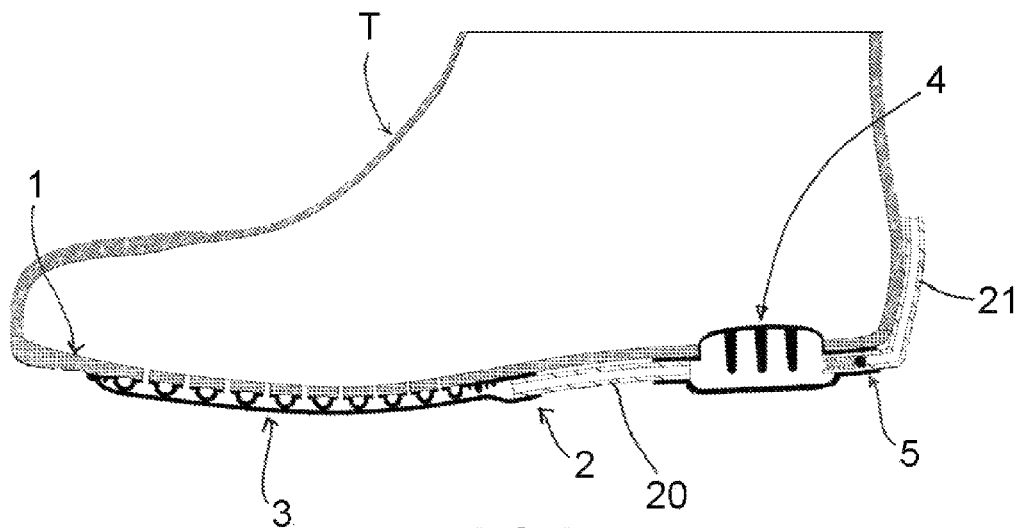
FIG. 6 shows a different embodiment of the upper, insole and ventilation system assembly of FIG. 5.

Referring to FIG. 6, the inlet pipe (21) can also be bent upwards and glued to the upper (T) in the heel area.

Figure 7:
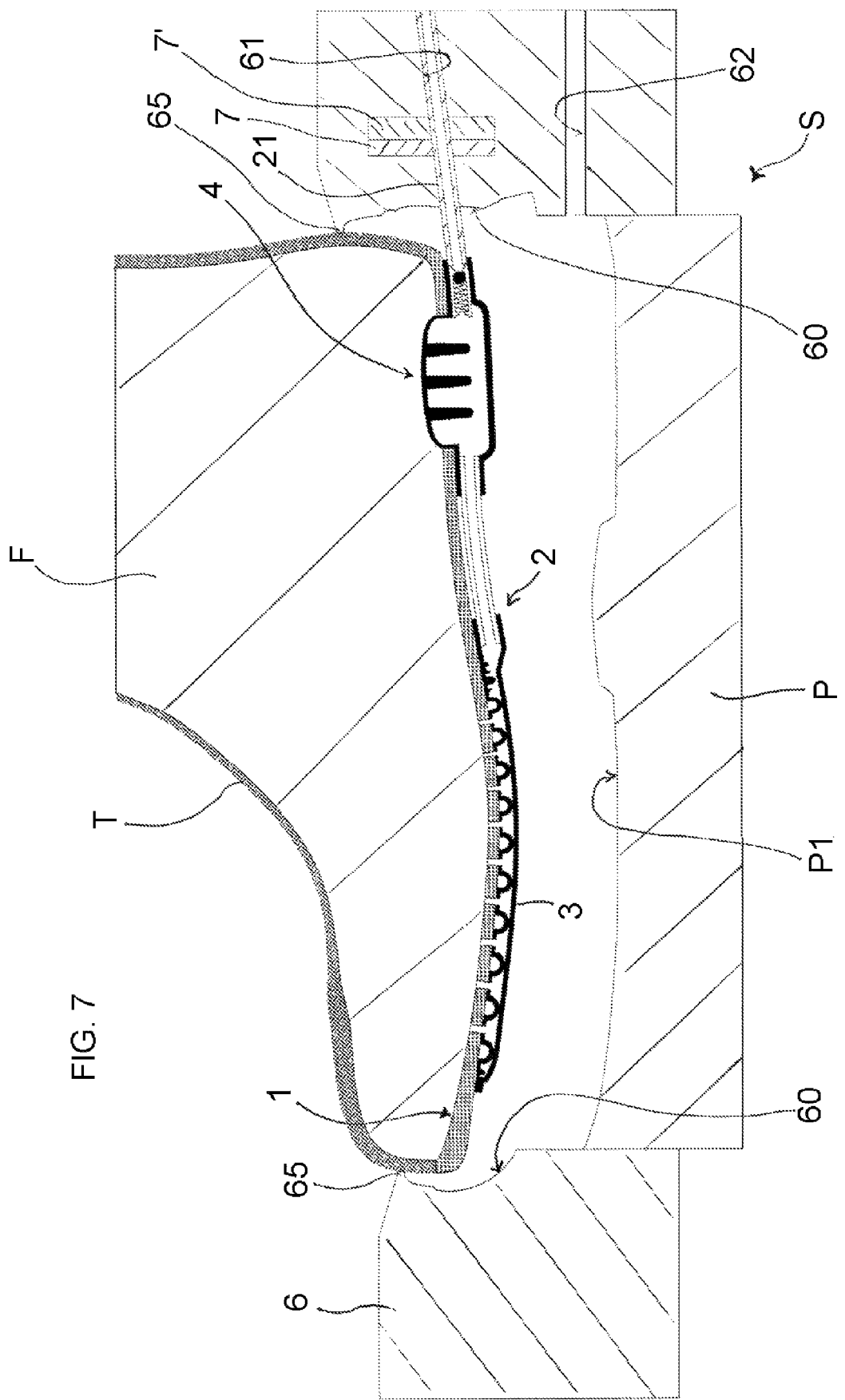
FIG. 7 is an axial sectional view that shows the upper, insole and ventilation system assembly of FIG. 5 inserted in open mould.
Figure 8:
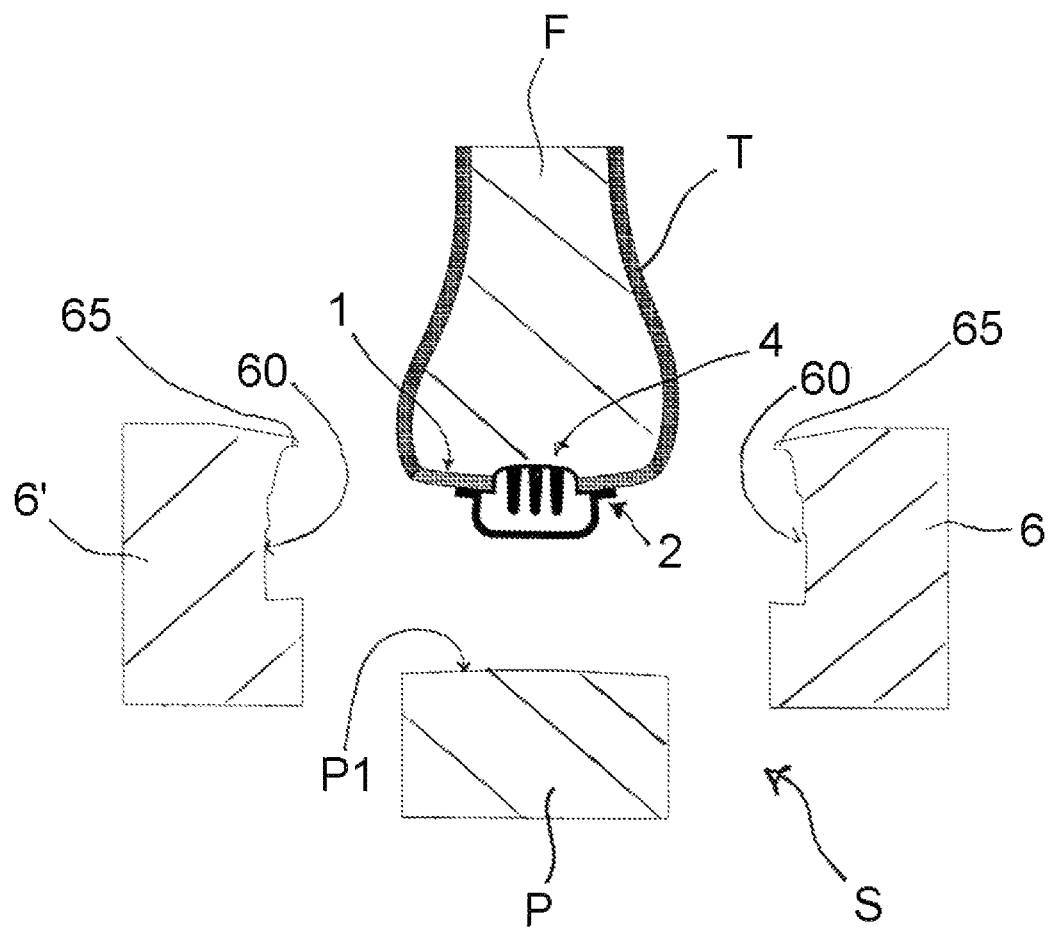
FIG. 8 is a cross-sectional view of FIG. 7.

Referring to FIGS. 7 and 8, the upper (T), insole (1) and ventilation system (2) assembly is put on the last (F) and inserted in a mould (S). The mould (S) comprises two half rings (6, 6') that extend laterally with respect to the shoe and a piston (P) that extends in lower position with respect to the shoe.

The piston (P) has an upper surface (P1) shaped in accordance with the tread to be obtained. The half rings (6, 6') have internal lateral surface (60) shaped in accordance with the lateral surface of the outsole to be obtained. The half rings (6, 6') have an upper border (65) that protrudes inwards and is stopped against the upper (T).

The back part of the half rings (6, 6') is provided with a hole (61) to insert the air inlet pipe (21). Moreover, the half rings (6, 6') have a channel (62) for injection of outsole material, such as polyurethane (PU).

Figure 12A:
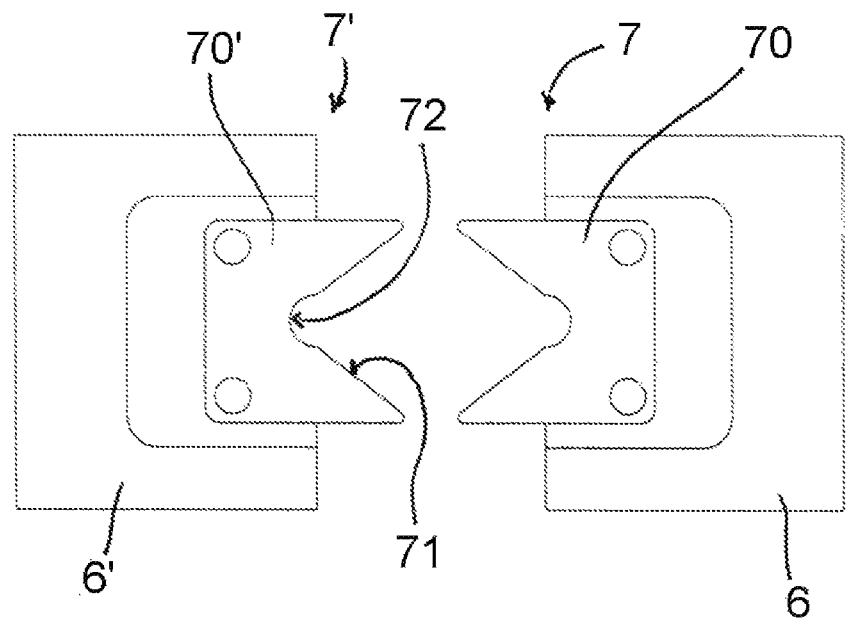
FIGS. 12A and 12B are two front views that show two guide plates of the half-rings of the mould, respectively in open and closed position.
Figure 12B:
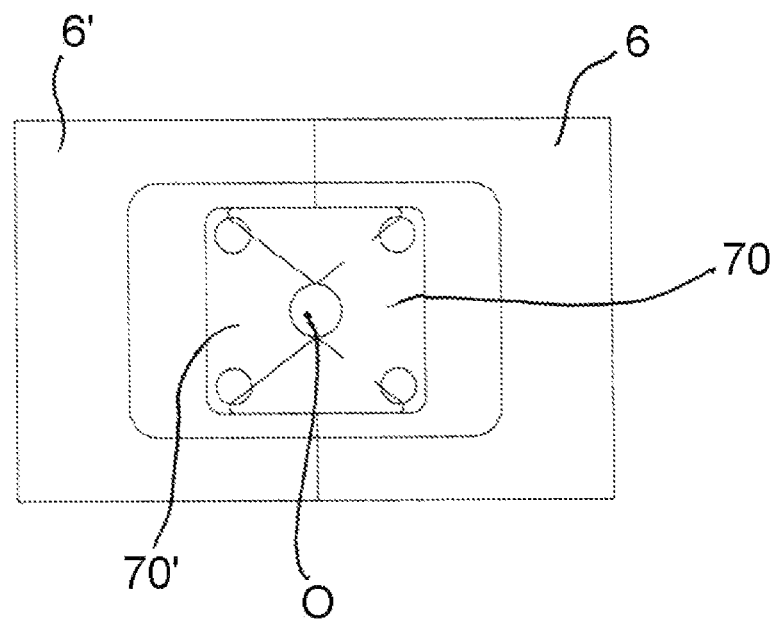

Corresponding guide plates (7, 7') are mounted in the back of the half rings (6, 6'). As shown in FIGS. 12A and 12B, the guide plates (7, 7') are provided with plates (70, 70') with V-shaped notches (71) ending in semicircle (72). In this way, when the two half rings (6, 6') are closed (FIG. 12B) the plates (70, 70') guide the air inlet pipe (21) towards a central hole (O) formed between the semicircular notches (72).

Figure 9:
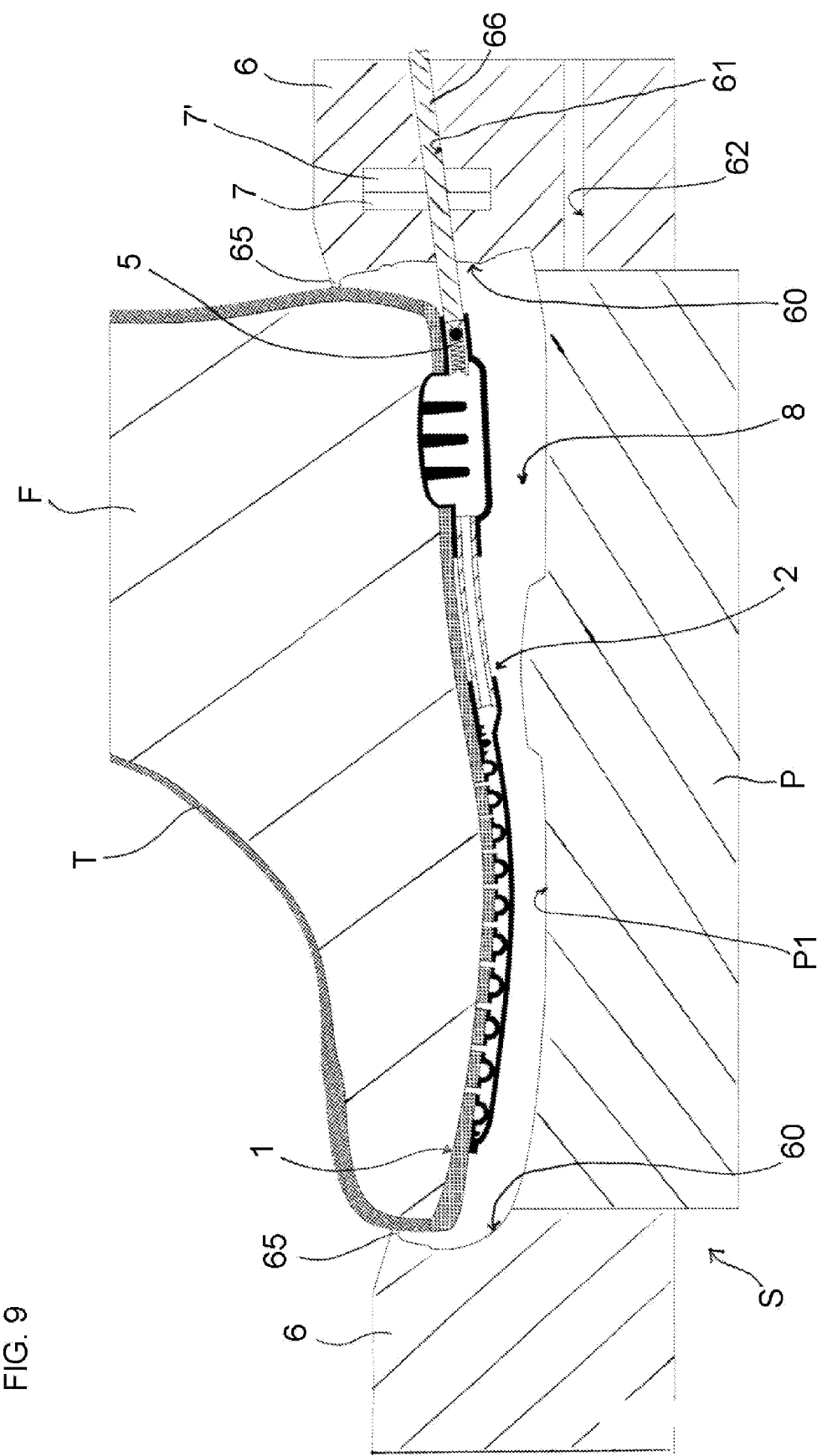
FIG. 9 is the same view as FIG. 7, with closed mould.
Figure 11:
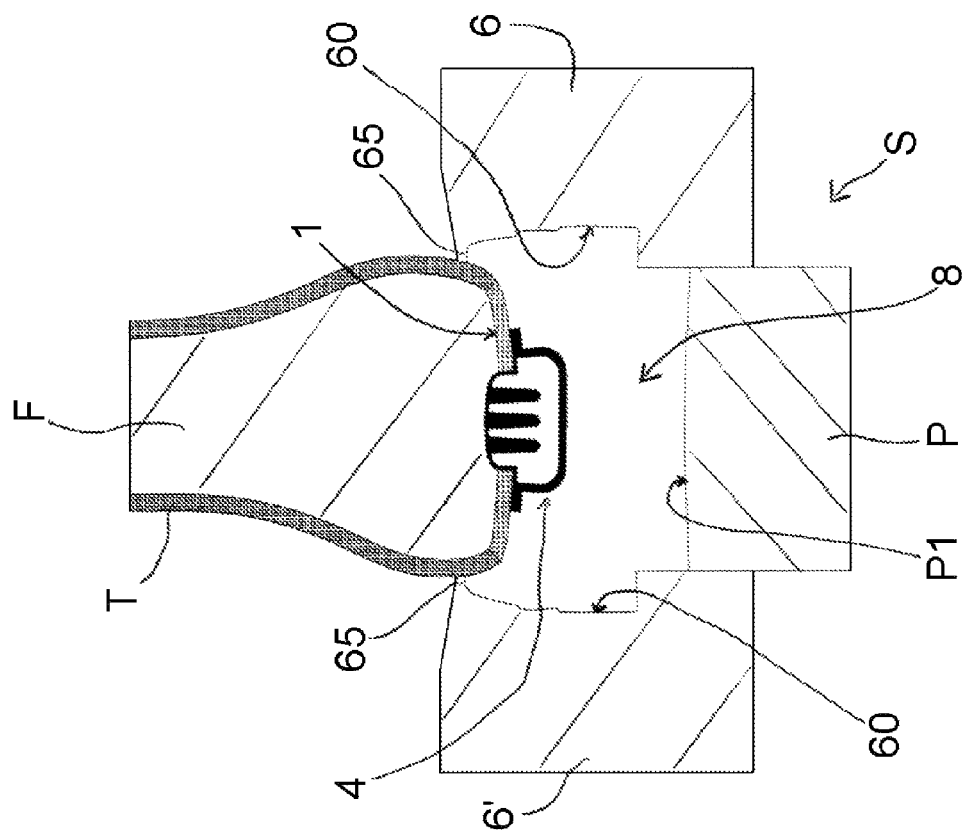
FIGS. 10 and 11 are two cross-sectional views of FIG. 9.
Figure 10:
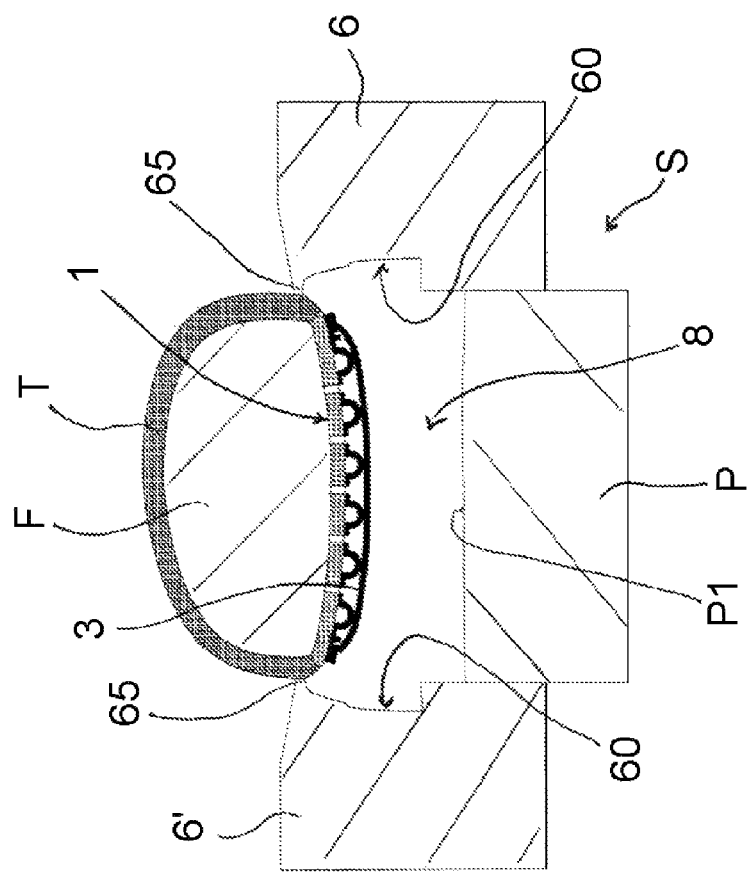

As shown in FIGS. 9, 10 and 11, the mould (S) is closed and the half rings (6, 6') are translated horizontally in such a way that all upper borders (65) get in close contact with the upper (T). The piston (P) is raised in such a way that the upper surface (P1) of the piston is connected with the lateral surface (60) of the half rings. In this way, a cavity (8) is formed under the insole (1) where outsole material must be injected. The ventilation mechanism (2) is totally contained in the cavity (8) of the mould. It must be noted that the upper borders (65) of the half rings (6, 6') are in contact with the upper (T), and therefore the cavity (8) of the mould also extends in the lower part of the upper (T).

FIG. 9 shows an embodiment wherein the ventilation mechanism (2) is not provided with air inlet pipe (21). In such a case, the mould (S) is provided with a male stem (66) that is inserted in the hole (61) of the half rings to close the inlet of the non-return valve (5). The presence of said stem (66) allows for molding a ventilation hole in the outsole that acts as air inlet conduit for the chamber (40) of the pump.

Referring to FIG. 13, expandable liquid material (L) is injected in the cavity (8) of the mould through the injection hole (62) to mould the outsole. As it is clearly shown in the figure, the liquid material (L) occupies about 20-30% of the volume of the cavity (8), with level slightly under the membrane (3) of the ventilation system.

Figure 14:
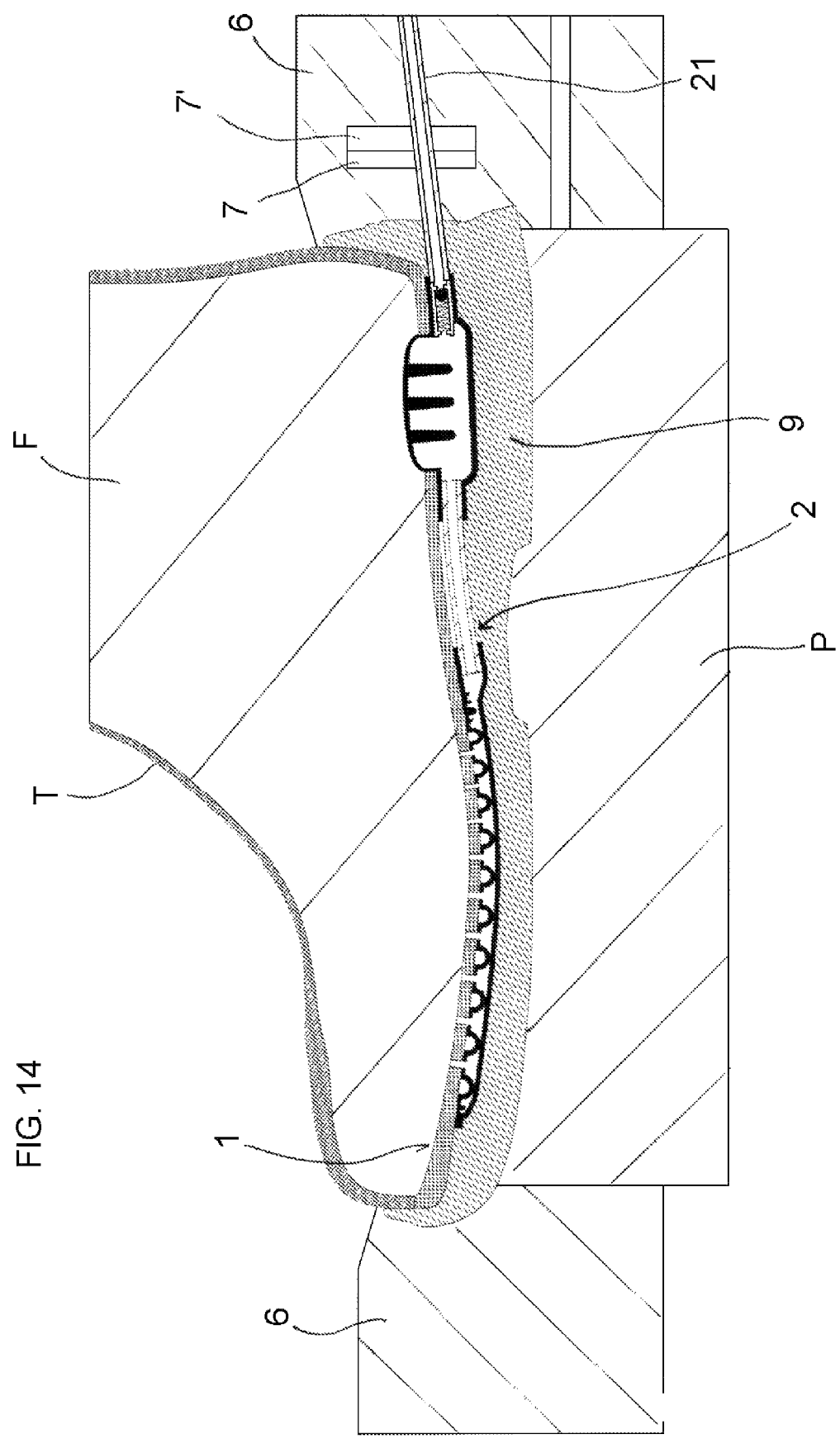
FIG. 14 is the same view as FIG. 13, with outsole material expanded in the mould.

Referring to FIG. 14, the liquid material (L) expands in the cavity (8) of the mould, forming the outsole (9) that perfectly adheres to ventilation system (2), insole (1) and lower part of upper (T).

Figure 15:
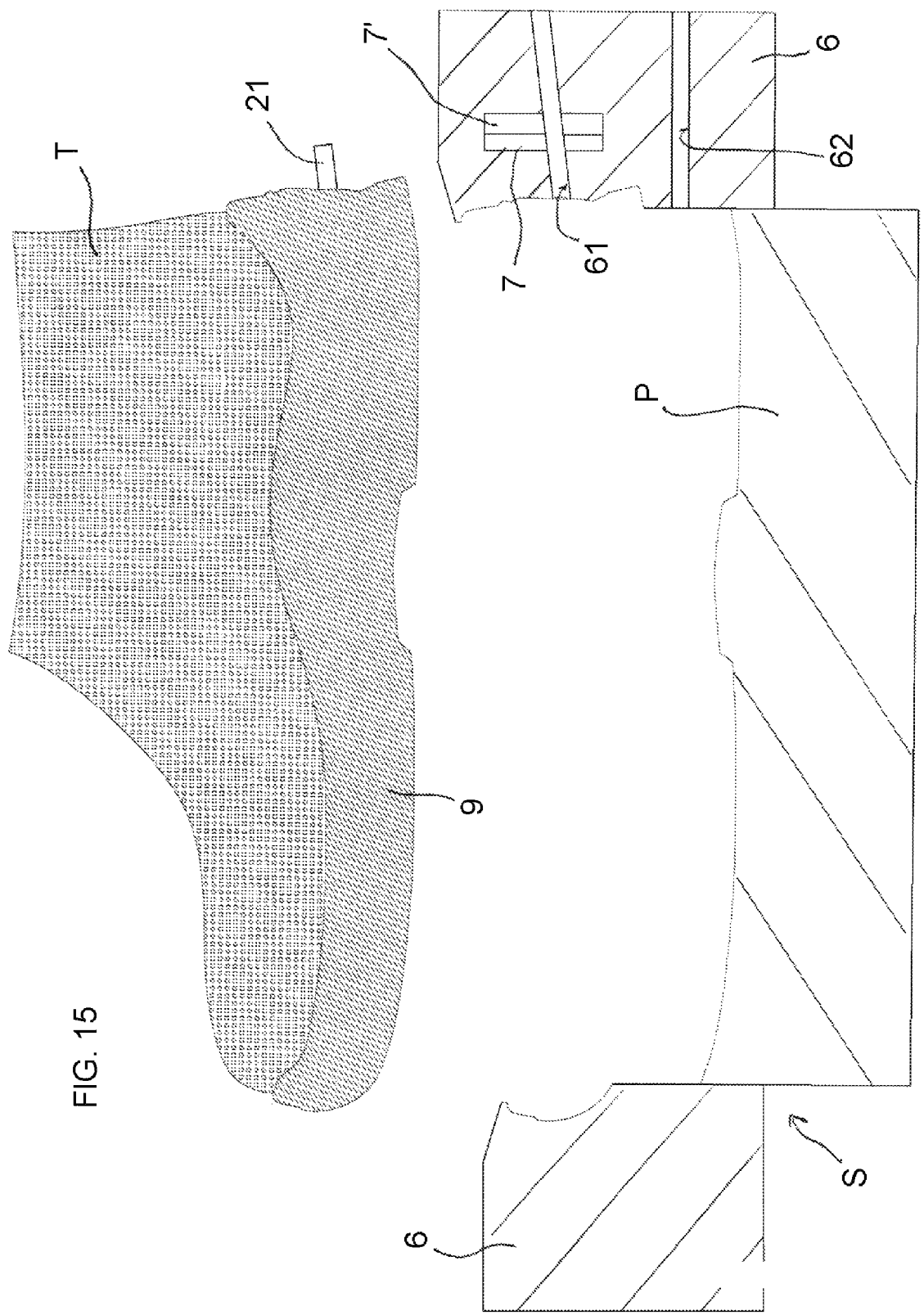
FIG. 15 is a diagrammatic view showing the finished shoe extracted from the mould.

Referring to FIG. 15, the mould (S) is opened and the finished shoe is extracted from the last (F). The part of the ventilation pipe (21) that protrudes externally from the outsole (9) is cut flush with the outsole, in order not to be visible.

Figure 16:
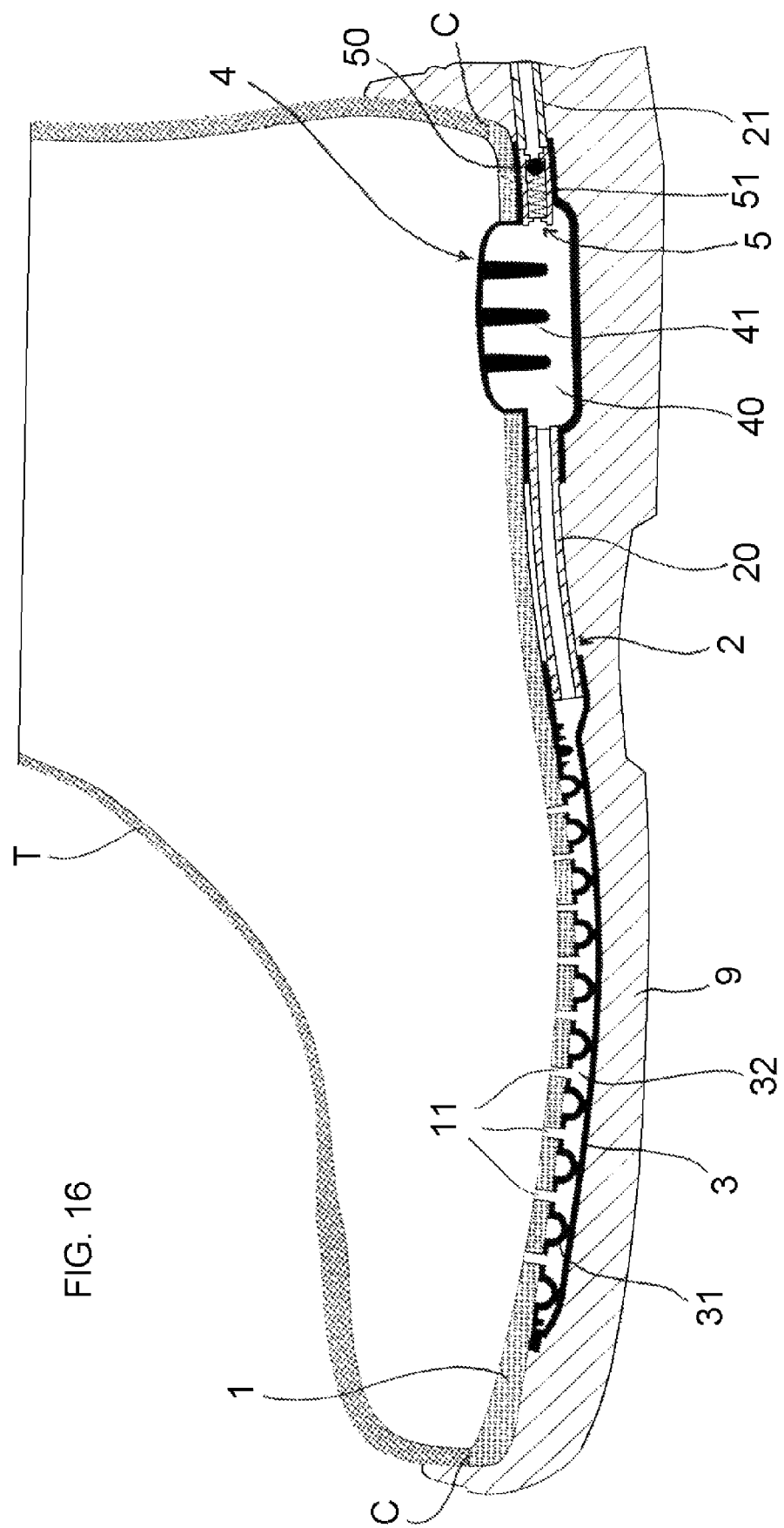
FIG. 16 is a cross-sectional view of the finished shoe.

FIG. 16 is a sectional view of the finished shoe. During walking, the heel of the outsole (9) rests on the ground and the heel of the user compresses the pump (4) that sends air through the connection conduit (20) towards the membrane (3). The air cannot go out of the inlet conduit (21) because of the presence of the non-return valve (5).

Air passes in the spaces (32) of the membrane and comes out of the holes (11) of the insole, ventilating the plantar surface of the foot, which is raised with respect to the insole (1).

By moving the centre of gravity of the body forward, the user completes the step, making the foot rotate in such a way that the plantar surface of the foot closes the holes (11) of the insole. Simultaneously, the heel of the foot is raised, freeing the pump (4). The non-return valve (5) opens and the chamber (40) of the pump is filled with air through the inlet pipe (21). In this way the chamber of the pump is filled with air and is ready for another pumping cycle.

In the following text identical elements or elements that correspond to elements that have already been described are indicated with the same reference numerals, omitting their detailed description.

Figure 17:
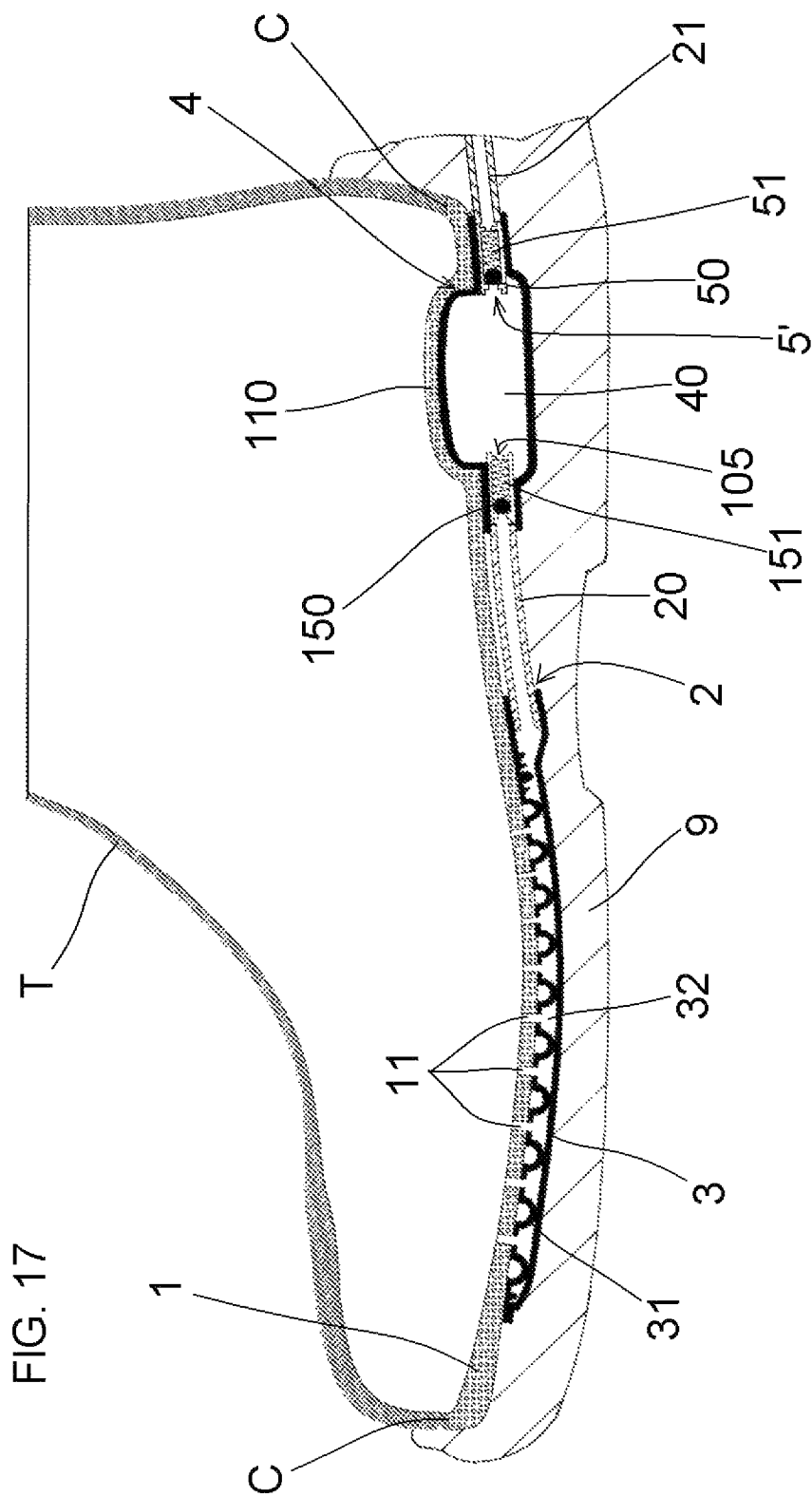
FIG. 17 is a cross-sectional view as FIG. 16, showing a first embodiment of the shoe.

FIG. 17 shows a first embodiment of the shoe, with insole (1) not provided with the slot (10) on the heel. The insole (1) is shaped with upward-protruding section (110) in the heel area, under which the upper protuberance of the pump (4) is disposed. Clearly, the protruding section (110) of the insole has suitable thickness to be flexible and allow for operation of the pump (4), while ensuring foot comfort.

The chamber (40) of the pump is not provided with deformable spacers (41).

The first valve (5') is configured in such a way to allow for air flow from the chamber (40) of the pump outwards, therefore the conduit (21) becomes an air outlet pipe to exhaust air outside the shoe.

Between the connection pipe (20) and the chamber of the pump (4) a second non-return (monodirectional) valve (105) is disposed, allowing for air flow from the connection pipe (20) to the chamber (40) of the pump and not vice versa.

For illustrative purposes, the second non-return valve (105) comprises a spherical shutter (150) stressed by a spring (151) to maintain the valve normally closed.

Figure 18:
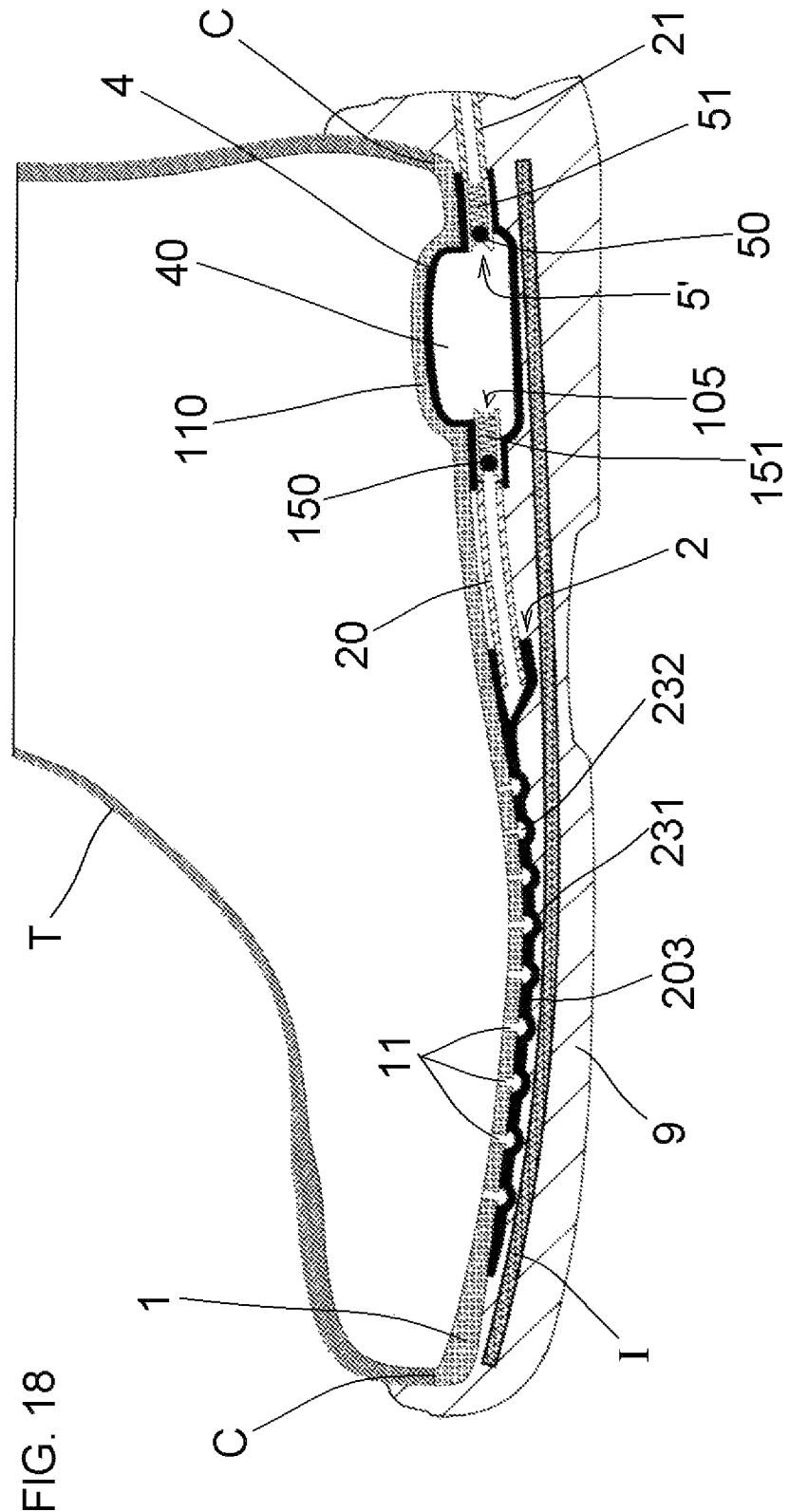
FIG. 18 is a cross-sectional view as FIG. 16, showing a second embodiment of the shoe.

FIG. 18 shows a second embodiment of the shoe, wherein only one membrane (203) is applied under the insole (1). The membrane (203) is provided with a plurality of projections (231) shaped as spherical segments that protrude downwards, in such a way to define on the upper surface a plurality of concave spaces (232) in mutual communication and in communication with the holes (11) of the insole.

Said embodiment further reduces the thickness of the ventilation system in the front part of the foot. In this way a plate (I) can be drowned in the outsole (9) and disposed under the ventilation system. The plate (I) can be made of metal or Kevlar or other anti-perforation material, in such a way to use the shoe as accident-prevention shoe.

Numerous variations and modifications can be made to the present embodiments of the invention by an expert of the field, while still falling within the scope of the invention as claimed in the enclosed claims.

The invention claimed is:

1. A shoe, comprising:
    an upper,
    an insole fixed to the upper,
    a ventilation system disposed under the insole, and
    an outsole including directly injectable expandable material and covering the ventilation system, the insole and a lower part of the upper, wherein said insole comprises a slot in a heel area and a plurality of holes in a plantar surface area, said ventilation system comprising:
a pump disposed in said slot of the insole to form an air chamber,
a membrane fixed in the lower surface of the insole under said holes in such a way to generate at least one space in communication with said holes,
a connection pipe that connects the air chamber of the pump with the at least one space of the membrane, and
an inlet or outlet conduit that connects the air chamber of the pump with the outside to extract or exhaust air,
wherein the membrane has an upper surface including (i) fixed regions directly fixed to a lower surface of the insole and (ii) protruding regions to form at least one space between the upper surface of the membrane and the lower surface of the insole,
wherein the outsole includes an outermost surface of the shoe and the outsole directly contacts the ventilation system,
wherein said ventilation system further comprises a non-return valve disposed between said pump and said outlet conduit to allow air flow from said outlet conduit to said pump and not in opposite direction, and
wherein said ventilation system further comprises a second non-return valve disposed between said pump and said connection conduit to allow air flow from said connection conduit to said pump and not in opposite direction.

2. The shoe as claimed in claim 1, wherein said non-return valve comprises a spherical shutter stressed by a spring.

3. The shoe as claimed in claim 1, further comprising a plurality of deformable spacers disposed between said membrane and said insole and shaped as an internally empty spherical segment facing the membrane, in mutual communication and in communication with said holes of the insole.

4. The shoe as claimed in claim 1, wherein said membrane is provided with a plurality of concave spaces in mutual communication and in communication with said holes of the insole.

5. The shoe as claimed in claim 1, wherein said outlet or inlet conduit is a pipe that is cut flush with an external surface of the outsole.

6. The shoe as claimed in claim 1, further comprising an anti-perforation plate made of metal and drowned in the outsole under said ventilation system.

7. A shoe comprising:
an upper;
an insole fixed to the upper;
a ventilation system under the insole; and
an outsole covering the ventilation system, the insole, and a lower part of the upper,
wherein the insole comprises a plurality of holes in a plantar surface area,
the ventilation system comprising:
a pump configured to form an air chamber,
a membrane fixed in a lower surface of the insole under the holes and arranged to form at least one space in communication with the holes,
a connection pipe connecting the chamber of the pump with the at least one space of the membrane, and
at least one of an inlet conduit or an outlet conduit connecting the chamber of the pump with the exterior of the shoe to extract or exhaust air,
wherein the membrane has an upper surface including (i) fixed regions directly fixed to a lower surface of the insole and (ii) protruding regions to form the at least one space between the upper surface of the membrane and the lower surface of the insole, wherein the outsole includes an outermost surface of the shoe and the outsole directly contacts the ventilation system,
wherein said ventilation system further comprises a non-return valve disposed between said pump and said outlet conduit to allow air flow from said outlet conduit to said pump and not in opposite direction, and
wherein said ventilation system further comprises a second non-return valve disposed between said pump and said connection conduit to allow air flow from said connection conduit to said pump and not in opposite direction.

8. The shoe according to claim 7, wherein the insole further comprises a slot in a heel area, and the pump of the ventilation system is disposed in the slot of the insole.

9. The shoe according to claim 7, wherein the insole further comprises a projection in a heel area, and the pump of the ventilation system is disposed in the projection of the insole.

10. The shoe according to claim 7, wherein the outsole is permanently fixed to the ventilation system, the insole and the lower part of the upper.

11. The shoe according to claim 7, wherein the pump of the ventilation system is in direct contact with the insole.

12. The shoe according to claim 7, wherein the outsole is expandable material.

13. The shoe according to claim 12, wherein the expandable material is directly injectable material.

14. A shoe, comprising:
an upper,
an insole fixed to the upper,
a ventilation system disposed under the insole, and
an outsole including directly injectable expandable material and covering the ventilation system, the insole and a lower part of the upper,
wherein
said insole comprises a projection in a heel area and a plurality of holes in a plantar surface area,
said ventilation system comprises
a pump disposed in said projection of the insole to form an air chamber,
a membrane fixed in the lower surface of the insole under said holes in such a way to generate at least one space in communication with said holes,
a connection pipe that connects the air chamber of the pump with the at least one space of the membrane, and
an inlet or outlet conduit that connects the air chamber of the pump with the outside to extract or exhaust air,
wherein the membrane has an upper surface including (i) fixed regions directly fixed to a lower surface of the insole and (ii) protruding regions to form at least one space between the upper surface of the membrane and the lower surface of the insole,
wherein the outsole includes an outermost surface of the shoe and the outsole directly contacts the ventilation system,
wherein said ventilation system further comprises a non-return valve disposed between said pump and said outlet conduit to allow air flow from said outlet conduit to said pump and not in opposite direction, and
wherein said ventilation system further comprises a second non-return valve disposed between said pump and said connection conduit to allow air flow from said connection conduit to said pump and not in opposite direction.

* * * * *